United States Patent
Devlin et al.

(10) Patent No.: US 7,795,359 B2
(45) Date of Patent: Sep. 14, 2010

(54) CONTINUOUS PROCESS FOR PRODUCTION OF POLYMERIC MATERIALS

(75) Inventors: Brian Gerrard Devlin, Suwanee, GA (US); Troy V. Holland, Suwanee, GA (US); Dawn Alison Smith, Duluth, GA (US); Alexander Azzawi, Mainz (DE)

(73) Assignee: Novartis AG, Basel (CH)

( * ) Notice: Subject to any disclaimer, the term of this patent is extended or adjusted under 35 U.S.C. 154(b) by 490 days.

(21) Appl. No.: 11/365,546

(22) Filed: Mar. 1, 2006

(65) Prior Publication Data

US 2006/0241242 A1    Oct. 26, 2006

Related U.S. Application Data

(60) Provisional application No. 60/658,930, filed on Mar. 4, 2005.

(51) Int. Cl.
C08F 2/00 (2006.01)
C08G 85/00 (2006.01)

(52) U.S. Cl. .............. 526/64; 526/74; 526/78; 525/53

(58) Field of Classification Search .......... 526/64, 526/74, 78; 623/11.11; 424/422; 436/100; 600/573; 525/53
See application file for complete search history.

(56) References Cited

U.S. PATENT DOCUMENTS

| 4,119,613 A | * | 10/1978 | Reischl et al. ........... 526/64 |
| 5,136,000 A | | 8/1992 | Luttenberger ............ 526/245 |
| 5,886,112 A | * | 3/1999 | Vuillemin et al. ......... 526/64 |
| 6,436,720 B1 | * | 8/2002 | Oberbeck et al. ......... 436/180 |
| 6,555,629 B1 | * | 4/2003 | Pysall et al. ............. 526/64 |
| 6,596,294 B2 | * | 7/2003 | Lai et al. ................ 424/422 |
| 6,602,473 B1 | | 8/2003 | Northrup ................ 422/102 |
| 6,727,096 B1 | | 4/2004 | Wang et al. .............. 436/37 |
| 6,729,352 B2 | | 5/2004 | O'Connor ............... 137/827 |

(Continued)

FOREIGN PATENT DOCUMENTS

DE    2549372    11/1975

(Continued)

OTHER PUBLICATIONS

International Search Report.

(Continued)

*Primary Examiner*—Milton I Cano
*Assistant Examiner*—Michael Leonard
(74) *Attorney, Agent, or Firm*—Jian Zhou (57) ABSTRACT

The invention provides a continuous-flow process for producing a polymeric material. The process of the invention comprises the steps of: introducing at least two solutions, each comprising one or more reactants, into a microreactor to mix the two solutions to form a reacting solution, wherein the one or more reactants are selected from the group consisting of a monomer, an initiator, a coupling agent, a prepolymer, a macromer, and mixtures thereof; feeding continuously the reacting solution into a flow-through polymerization reactor in a coil form, wherein the flow-through polymerization reactor is capable of providing a residence time sufficient for (co)polymerizing the reactants to form a polymer with a desired polydispersity, wherein the flow-through polymerization reactor is immersed in an ultrasonic bath to minimize or substantially eliminate unwanted high-molecular-weight fractions of the polymer.

20 Claims, 3 Drawing Sheets

U.S. PATENT DOCUMENTS

| | | | |
|---|---|---|---|
| 6,747,178 B1 | 6/2004 | Harston | 570/175 |
| 6,756,195 B2 | 6/2004 | Weinberg | 435/4 |
| 6,759,014 B2 | 7/2004 | Dales | 422/130 |
| 6,770,245 B2 | 8/2004 | Akporiaye | 422/82.12 |
| 6,776,963 B1 | 8/2004 | Akporiaye | 422/82.12 |
| 6,787,112 B1 | 9/2004 | Turner | 422/130 |
| 6,818,183 B2 | 11/2004 | Hajduk | 422/68.1 |
| 2001/0041357 A1 | 11/2001 | Fouillet | 435/91.1 |
| 2001/0049078 A1 | 12/2001 | Long | 564/215 |
| 2001/0056301 A1* | 12/2001 | Goupil et al. | 623/11.11 |
| 2003/0039169 A1 | 2/2003 | Ehrfeld | 366/336 |
| 2003/0055293 A1 | 3/2003 | Wurziger | 568/451 |
| 2003/0139630 A1 | 7/2003 | Wurziger | 568/451 |
| 2003/0145894 A1 | 8/2003 | Burns | 137/833 |
| 2003/0156998 A1 | 8/2003 | Gilligan | 122/102 |
| 2003/0175168 A1 | 9/2003 | Gilligan | 422/102 |
| 2003/0180216 A1 | 9/2003 | TeGrotenhuis | 423/659 |
| 2004/0058407 A1 | 3/2004 | Miller | 435/29 |
| 2004/0066118 A1 | 4/2004 | Pieper | 310/339 |
| 2004/0121454 A1 | 6/2004 | Jury | 435/288.5 |
| 2004/0241865 A1 | 12/2004 | Gabski | 436/49 |
| 2004/0256241 A1 | 12/2004 | Xu | 205/148 |
| 2005/0007872 A1 | 1/2005 | Nagasawa | 366/178.2 |
| 2005/0025677 A1 | 2/2005 | Oberbeck | 422/130 |
| 2005/0026134 A1 | 2/2005 | Miller | 435/3 |
| 2005/0172462 A1* | 8/2005 | Rudduck et al. | 24/606 |
| 2008/0139963 A1* | 6/2008 | Carney et al. | 600/573 |
| 2008/0207851 A1 | 8/2008 | Schulte et al. | 526/64 |

FOREIGN PATENT DOCUMENTS

| | | | |
|---|---|---|---|
| DE | 100 63 027 A1 | 12/2000 | |
| EP | 1060014 | 3/1999 | |
| EP | 1 650 228 A1 | 4/2006 | |
| WO | WO 95/26796 | 10/1995 | 15/8 |
| WO | WO 96/12540 | 5/1996 | 11/4 |
| WO | WO 96/12541 | 5/1996 | 11/4 |
| WO | WO 96/30113 | 10/1996 | 5/6 |
| WO | WO 00/62913 | 10/2000 | 3/8 |
| WO | WO 00/62918 | 10/2000 | |

OTHER PUBLICATIONS

Microreactor from Wikipedia, the free encyclopedia, "http://en.wikipedia.org/wiki/Microreactor", pp. 1-6.

* cited by examiner

CONTINUOUS PROCESS FOR PRODUCTION OF POLYMERIC MATERIALS

This application claims the benefit under 35 USC 119(e) of the U.S. Provisional Patent Application No. 60/658,930 filed Mar. 4, 2005, herein incorporated by reference in its entirety.

The present invention is related to a continuous process for producing a polymeric material, preferably, a polymerizable/crosslinkable polymeric material. The present invention is also related to a system for preparing a polymeric material in a continuous flow fashion.

BACKGROUND

There has been a growing interest in the mass production of contact lenses from a lens-forming composition comprising at least one polymerizable/crosslinkable polymeric material. For example, various water-soluble, actinically-crosslinkable prepolymers (e.g., those disclosed in U.S. Pat. Nos. 5,508,317, 5,583,163, 5,665,840, 5,712,356, 5,789,464, 5,849,841, 5,849,810, 6,165,408, 6,221,303, 6,303,687, 6,479,587, in U.S. patent Application Publication No. 2004/0082680A1, in EP 932,635, and in PCT patent application WO 2000/31150, herein incorporated by references in their entireties) have been developed as starting materials for producing hydrogel contact lenses at considerably low cost according to a fast, highly efficient contact lens manufacturing process disclosed in U.S. Pat. Nos. 5,508,317, 5,583,163, 5,789,464 and 5,849,810. Other examples include without limitation macromers developed as one of starting materials for making silicone hydrogel contact lenses (e.g., lotrafilicon A, lotrafilcon B, balafilcon A, galyfilcon A, senofilcon A, etc.). So far, preparation of those polymerizable/crosslinkable polymeric materials is carried out manually or semi-manually in a batch or semi-batch process. However, synthesis of those polymerizable/crosslinkable polymeric materials may represent a considerable risk to people and the environment due to use of a relatively large amount of highly toxic chemical substances. Furthermore, synthesis of those polymeric materials requires strict adherence to numerous reaction conditions (e.g., temperature, reactant concentrations, uniform local concentration profile of reactants, reaction time in a reactor, pressure, reaction medium, etc.). Batch or semi-batch polymerization technologies inherently have a great difficulty in ensuring uniform product quality and consistency in product quality between batch preparations. Therefore, there is a need for a continuous process for producing polymerizable/crosslinkable polymeric materials in a simple, reproducible, and highly-controllable manner with increased safety for humans and the environment and with good yields.

The objects of the invention therefore are to provide systems and methods for performing polymerization or copolymerization in a continuous-flow, reproducible, and highly-controllable manner with increased safety for humans and the environment and with good yields.

SUMMARY OF THE INVENTION

In accomplishing the foregoing, there is provided a continuous-flow process for making a polymeric material and to a reactor system for performing the process of the invention.

In one aspect, the invention provides a continuous-flow process for producing a polymeric material, the process comprising the steps of: introducing at least two solutions, each comprising one or more reactants, into at least one microreactor to mix the two solutions to form a reacting solution, wherein each reactant is selected from the group consisting of a monomer, an initiator, a coupling agent, a chain extender, a prepolymer, a macromer, and mixtures thereof; feeding continuously the reacting solution into a flow-through polymerization reactor in a coil form, wherein the flow-through polymerization reactor is capable of providing a residence time sufficient for (co)polymerizing the reactants to form a polymer with a desired polydispersity, wherein the flow-through polymerization reactor is immersed in an ultrasonic bath to minimize or substantially eliminate unwanted high-molecular-weight fractions of the polymer.

In another aspect, the invention provides a continuous-flow process for producing a polymeric material, the process comprising the steps of: introducing at least two solutions, each comprising one or more reactants, into at least one microreactor to mix the two solutions to form a reacting solution, wherein each reactant is selected from the group consisting of a monomer, an initiator, a coupling agent, a chain extender, a prepolymer, a macromer, and mixtures thereof; feeding continuously the reacting solution into at least one extruder or device based on extruding technology, wherein the extruder or device is capable of providing a residence time sufficient for (co)polymerizing the reactants to form a polymer with a desired polydispersity and capable of disturbing lamella flow of the reacting solution so as to minimize or substantially eliminate unwanted high-molecular-weight fractions of the polymer.

In a further aspect, the present invention provides a system for preparing a polymeric material in a continuous-flow manner, the system comprising: at least one microreactor into which at least two solutions, each comprising one or more reactants, can be introduced and mixed to form a reacting solution, wherein each reactant is selected from the group consisting of a monomer, an initiator, a coupling agent, a chain extender, a prepolymer, a macromer, and mixtures thereof; a flow-through polymerization reactor which is in a coil form and in flow communication with the microreactor so that the reacting solution can be fed continuously into the flow-through polymerization reactor, wherein the flow-through polymerization reactor is capable of providing a residence time for (co)polymerizing the reactants to form a polymer with a desired polydispersity, wherein the flow-through polymerization reactor is immersed in an ultrasonic bath to minimize or substantially eliminate formation of unwanted high-molecular-weight fractions of the polymer.

In a still further aspect, the present invention provides a system for preparing a polymeric material in a continuous-flow manner, the system comprising: at least one microreactor into which at least two solutions, each comprising one or more reactants, can be introduced and mixed to form a reacting solution, wherein each reactant is selected from the group consisting of a monomer, an initiator, a coupling agent, a chain extender, a prepolymer, a macromer, and mixtures thereof; at least one extruder or device based on extruding technology, wherein the extruder or device is capable of providing a residence time sufficient for (co)polymerizing the reactants to form a polymer with a desired polydispersity and capable of disturbing lamella flow of the reacting solution so as to minimize or substantially eliminate unwanted high-molecular-weight fractions of the polymer.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE PREFERRED EMBODIMENTS

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

A "prepolymer" refers to a starting polymer which comprises crosslinkable groups and can be cured (e.g., crosslinked and/or polymerized) actinically or thermally or chemically to obtain a crosslinked and/or polymerized polymer having a molecular weight much higher than the starting polymer.

A "actinically-crosslinkable prepolymer" refers to a starting polymer which contains ethylenically unsaturated groups and can be crosslinked upon actinic radiation to obtain a crosslinked polymer having a molecular weight much higher than the starting polymer. Exemplary ethylenically unsaturated groups include without limitation acryloyl, methacryloyl, allyl, vinyl, styrenyl, or other C=C containing groups. Examples of actinic radiation are UV irradiation, ionized radiation (e.g. gamma ray or X-ray irradiation), microwave irradiation, and the like.

The term "crosslinkable groups" is employed herein in a broad sense and is intended to encompass, for example, functional groups and photo crosslinkable or thermally crosslinkable groups, which are well-known to a person skilled in the art. It is well known in the art that a pair of matching crosslinkable groups can form a covalent bond or linkage under known reaction conditions, such as, oxidation-reduction conditions, condensation conditions, addition conditions, substitution (or displacement) conditions, free radical polymerization conditions, 2+2 cyclo-addition conditions, Diels-Alder reaction conditions, ROMP (Ring Opening Metathesis Polymerization) conditions, vulcanization conditions, cationic crosslinking conditions, and epoxy hardening conditions. For example, an amino group is covalently bondable with aldehyde (Schiff base which is formed from aldehyde group and amino group may further be reduced); an hydroxyl group and an amino group are covalently bondable with carboxyl group; carboxyl group and a sulfo group are covalently bondable with hydroxyl group; a mercapto group is covalently bondable with amino group; or a carbon-carbon double bond is covalently bondable with another carbon-carbon double bond.

Exemplary crosslinkable groups include, without limitation, hydroxyl group, amino group, amide group, sulfhydryl group, —COOR (R and R' are hydrogen or $C_1$ to $C_8$ alkyl or cycloalkyl groups), halide (chloride, bromide, iodide), carbonyl halide isothiocyanate, isocyanate, monochlorotriazine, dichlorotriazine, mono- or di-halogen substituted pyridine, mono- or di-halogen substituted diazine, phosphoramidite, maleimide, aziridine, sulfonyl halide, hydroxysuccinimide ester, anhydride, hydroxysulfosuccinimide ester, imido ester, hydrazine, axidonitrophenyl group, azide, 3-(2-pyridyldithio)proprionamide, glyoxal, aldehyde, epoxy, olefinically unsaturated radicals.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), and microwave irradiation.

A "macromer" refers to a medium and high molecular weight compound or polymer that contains crosslinkable groups capable of undergoing further polymerizing/crosslinking reactions. Medium and high molecular weight typically means average molecular weights greater than 700 Daltons. Preferably, a macromer contains ethylenically unsaturated groups and can be polymerized actinically or thermally.

A "polymer" means a material formed by polymerizing/crosslinking one or more monomers, prepolymers, macromers, or combinations thereof.

$M_n$ is the number-average molecular weight of a polymer. $M_w$ is the weight-average molecular weight of a polymer.

A "hydrogel" means a cross-linked polymer having an equilibrium water content of between about 10 and 90 percent by weight.

A "silicone hydrogel" refers to a hydrogel obtained by copolymerization of a polymerizable composition comprising at least one silicone-containing monomer or at least one silicone-containing macromer.

A "monomer" means a low molecular weight compound that comprises one or more crosslinkable groups and can be crosslinked and/or polymerized actinically or thermally or chemically to obtain a crosslinked and/or polymerized polymer. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

An "initiator" refers to a chemical commonly known to a person skilled in the art that initiates crosslinking, polymerizing, or copolymerizing reactions.

The term "microreactor", as used herein, is intended to describe miniaturized reaction systems fabricated by using, at least partially, methods of microtechnology and precision engineering, as it is well known in the art (W. Ehrfeld, V. Hessel, H. Löwe, "Microreactors", WILEY-VCH: Weiheim (Federal Republic of Germany, 2000, incorporated herein by reference in its entirety). The characteristic dimensions of the internal structures of microreactors, like fluid channels, typically range from the submicrometer to the sub0millimeter range.

Typically, micro-reactors are composed of individual processing modules (or units or microdevices) designed for different tasks. Examples of individual processing modules include without limitation micromixers, micro heat exchangers, microseparators, microfilters, gas phase reactors, liquid phase reactors, gas/liquid reactors, sensors, detectors, actuators, and the like. The individual processing modules must be in fluid communication with each other.

A micromixer is intended to describe a miniaturized device which perform a mixing process with the goal of achieving a uniform distribution of different components in a mixture within a short period of time. Due to the small channel dimensions of micromixers, almost all of micromixers rely on a laminar flow regime to mix/integrate two or more fluids into one phase. Generally, a micromixer is built to have a flow arrangement based on one of the following mixing concepts: contacting of two or more substreams, collision of two or more substreams, injection of many small substreams of one component in a main stream of another component, injection of many substreams of two components, decrease of diffusion path perpendicular to the flow direction by increase of flow velocity, manifold splitting and recombinating, and periodic injection of small fluid segments.

Micro-reactors can be advantageously used in carrying out process syntheses under continuous synthesis conditions, which thus far have been known only from large-scale facilities. The thermal aspect of the reaction can be controlled with hitherto unmatched precision, because the walls between the passageways transporting the reaction medium and a heat exchange medium can frequently be made very thin. The small volumes, where very small material quantities can react with each other, allow a very safe process control, in particular when carrying out critical or dangerous syntheses.

In one aspect, the invention provides a continuous-flow process for producing a polymeric material, the process comprising the steps of: introducing at least two solutions, each comprising one or more reactants, into at least one microreactor to mix the two solutions to form a reacting solution, wherein each reactant is selected from the group consisting of a monomer, an initiator, a coupling agent, a chain extender, a prepolymer, a macromer, and mixtures thereof; feeding continuously the reacting solution into a flow-through polymerization reactor in a coil form, wherein the flow-through polymerization reactor is capable of providing a residence time sufficient for (co)polymerizing the reactants to form a polymer with a desired polydispersity, wherein the flow-through polymerization reactor is immersed in an ultrasonic bath to minimize or substantially eliminate unwanted high-molecular-weight fractions of the polymer.

In accordance with the invention, polymeric materials prepared according to a process of the invention can be any polymers or copolymers comprising polymer-building units (i.e., derived from individual reactants) covalently linked together by a covalent bond or linkage formed under known reaction conditions, such as, oxidation-reduction conditions, condensation conditions, addition conditions, substitution (or displacement) conditions, free radical polymerization conditions, 2+2 cyclo-addition conditions, Diels-Alder reaction conditions, ROMP (Ring Opening Metathesis Polymerization) conditions, vulcanization conditions, cationic crosslinking conditions, and epoxy hardening conditions. Exemplary covalent bonds or linkage, which are formed between pairs of monomer units in a polymer, include without limitation, alkane (carbon-carbon single bond), alkene (carbon-carbon double bond), ester, ether, acetal, ketal, vinyl ether, carbamate, urea, urethane, amine, amide, enamine, imine, imide, oxime, amidine, iminoester, carbonate, orthoester, phosphonate, phosphinate, sulfonate, sulfinate, sulfide, sulfate, disulfide, sulfinamide, sulfonamide, thioester, aryl, silane, siloxane, heterocycles, thiocarbonate, thiocarbamate, and phosphonamide. Preferably, a polymeric material prepared according to the invention is a prepolymer or a macromer suitable for making hydrogel contact lenses or silicone-hydrogel contact lenses.

A process of the invention can be applied to, without limitation, step-reaction (co)polymerizations, step-reaction polycondensation reactions, ionic chain-reaction (co)polymerizations, complex coordinative (co)polymerizations, and free-radical chain (co)polymerizations. Preferably, a process of the invention is applied to a step-reaction (co)polymerization. More preferably, a process of the invention is applied to a step-reaction copolymerization of a reacting solution including a first class of one or more reactants and a second class of one or more reactants, wherein each of the first class of the reactants comprises two or more first crosslinkable groups and each of the second class of the reactants comprises two or more second crosslinkable groups coreactive with the first crosslinkable groups to form covalent bonds or linkages.

In accordance with the invention, reactants can be any compounds required in the above-described (co)polymerization. For example, a reactant can be an initiator or a coupling agent or a (co)polymer-building-block which can be a monomer, a prepolymer, a chain extender, or a macromer.

Any known suitable initiators can be used in the invention. A person skilled in the art will know well how to select an initiator for initiating a (co)polymerization.

Any known suitable coupling agents can be used in the invention. A person skilled in the art will know well how to select a coupling agent to crosslink two (co)polymer-building-block units. For example, a carbodiimide can be used in the coupling of a carboxy group with an amino group without formation of cross-bridge between the molecules being coupled. The carbodiimide facilitates amide formation. Examples of carbodiimides are 1-ethyl-3-(3-dimethylaminopropyl)carbodiimide (EDC), N,N'-dicyclohexylcarbodiimide (DCC), 1-cylcohexyl-3-(2-morpholinoethyl)carbodiimide, diisopropyl carbodiimide, or mixtures thereof. N-hydroxysuccinimide (NHS) or N-hydroxysulfosuccinimide may be desirably included in carbodiimide (e.g., EDC)-mediated coupling reaction to improve coupling (conjugation) efficiency. EDC couples NHS to carboxyls, resulting in an NHS-activated site on a molecule. The formed NHS-ester can react with amines to form amides.

Preferably, a resin-bound carbodiimide is used to coupling carboxyls and amines. The resin-bound reagents are easily removed by filtration or decanting and as such, purification of reaction products is simplified. It is preferably that resin-bound 1-hydroxybenzotriazole catalyst is used together with a resin-bound carbodiimide for making an amine-capped poly(oxyalkylene)-containing polyamide of the invention.

Any known suitable (co)polymer-building blocks (i.e., monomers, prepolymers, macromers, or mixtures thereof) can be used so long each of them contains at least one crosslinkable group, preferably at least two crosslinkable groups. A person skilled in the art will know well how to select one or more (co)polymer-building blocks.

In accordance with the invention, a solution comprising one or more reactants can be prepared by dissolving the reactants in a suitable solvent. A solvent can be water, any appropriate organic solvent, a mixture of water and one or more water soluble or water miscible organic solvents, or a mixture of several organic solvents. Any known suitable solvents can be used, so long as they can dissolve the monomers and/or the initiator. Exemplary solvents include, without limitation, water, acetone, alcohols (e.g., methanol, ethanol, propanol, isopropanol, etc.), glycols, ketones, esters, cyclopentanone, cyclohexanone, tetrahydrofuran (THF), acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide.

Examples of water soluble or water miscible organic components include without limitation, ethylene glycol, propylene glycol, diethylene glycol, glycerine, dipropylene glycol, polyethylene glycol, polypropylene glycol, amides, ethers, urea, substituted ureas, carboxylic acids and their salts, esters, alcohols, organosulfides, organosulfoxides, sulfones (such as sulfolane), alcohol derivatives, carbitol, butyl carbitol, cellosolve, tripropylene glycol monomethyl ether, ether derivatives, amino alcohols, ketones, N-methylpyrrolidinone, 2-pyrrolidinone, cyclohexylpyrrolidone, hydroxyethers, sulfoxides, lactones, polyelectrolytes, methyl sulfonylethanol, tetrahydrofuran (THF), imidazole, betaine, and other water soluble or water miscible materials, as well as mixtures thereof.

Each solution to be introduced in a microreactor generally comprises one or more reactants which are not reactive with each other. If there are two reactants which can react with each other, they should be contained separately in two separate solutions, namely, one in a first solution and the other in a second solution.

In accordance with the invention, any known suitable microreactors can be used. Preferably, microreactors are those described by by W. Ehrfeld in Chimia 56 (2002), 598-604 (especially FIG. 7) (herein incorporated by reference in its entirety), which each are composed of individual processing modules. The individual processing modules are provided with connecting elements via a connection system. The connecting elements are non-positively connected during assembly in such a way that fluid channels leading from one processing module to the next are connected with each other so as to form a seal to the outside. Connecting elements are considered to be formfittingly connected when they represent an integral part of the modules. Preferably the individual processing modules are arranged on a base plate, the fluid connection between two modules being sealed with a sealing plate and the modules being clamped together with clamping devices.

A person skilled in the art will know well how to select individual processing modules and assemble them into a microreactor used in the invention. In accordance with the invention, a microreactor includes at least one micromixer. Any types of micromixers can be used in the invention.

A microreactor preferably includes one or more micro heat exchangers which control the temperature of one or more solutions to be fed into a micromixer and the temperature of the reacting solution to be fed into the flow-through polymerization reactor in a coil form.

Optionally, a microreactor can further include microfilters, pressure sensors, detectors, and/or actuators.

A microreactor is used in the invention to mix thoroughly reactants in a reacting solution before feeding the reacting solution into a flow-through polymerization reactor. Therefore, it is advantageous and desirable that the temperature of the solutions to be fed into a micromixer is maintained at a relatively low temperature at which no substantial (co)polymerization can occur within the microreactor. As used herein, "no substantial (co)polymerization" is intended to describe that there is minimal or no gelation within the microreactor.

It is understood that one can also slow down the rate of (co)polymerization in the microreactor by diluting the concentrations of one or more reactants, preferably while maintaining a total stoichiometry of the reactants. For example, for a step-reaction copolymerization of a reacting solution, one can dilute one or both of the two solutions to be fed into a microreactor to form the reacting solution. Where only one solution is diluted, one can proportionally increase the flow rate of that solution accordingly so that the total apparent stoichiometry of all reactants remain unchanged. A person skilled in the art will know how to select appropriate concentration of each reactant to slow down (co)polymerization of the reactants so that no substantial (co)polymerization occurs in the microreactor and how to adjust flow rates to keep total stoichiometry unchanged.

In a preferred embodiment, no substantial (co)polymerization occurring in the microreactor is ensured by maintaining the temperature of at least one solution to be fed into a micromixer relatively low and/or diluting the concentration of at least one reactant while maintaining a desirable total stoichiometry of the reactants constant.

A microreactor can accurately control concentration ratios (or stoichiometry) of reactants and can efficiently control the temperature of the reacting solution to be fed into the flow-through polymerization reactor by its heat exchanger unit(s) after a micromixer.

As used herein, a flow-through polymerization reactor in a coil form is intended to describe a compact device having a tunnel with a desired length. The length of the tunnel of a flow-through polymerization reactor can be chosen to provide a residence time sufficient for (co)polymerizing reactants to form a polymer with a desired polydispersity. In accordance with the invention, the length of a tunnel of a flow-through polymerization reactor is preferably from about 0.5 m to 100 m, more preferably from about 2 m to about 100 m. The tunnel can have substantially-constant or varied cross-sections in shape and/or sectional area along the flow direction.

In accordance with the invention, a flow-through polymerization reactor can be one single tube, a cluster (or plurality) of tubes being connected with one to another to form a flow-through tunnel, one or more static mixers or reactors, a coil, combinations thereof, or the like.

Alternatively, the tunnel can be built into a device to let a liquid flow-through according to any known suitable method.

Examples of static mixers and reactors include Sulzer mixers, Sulzer reactors, and devices described in EP 1 184 159 A2 (herein incorporated by reference in its entirety). Exemplary Sulzer mixers and reactors are Sulzer SMX mixer, Sulzer SMI mixer, Sulzer SMR mixer-reactor, Sulzer SMXL monotube mixer-heat exchang, Sulzer mixer SMV from Sulzer Chemtech;

Preferably, the tunnel has a substantially circular cross-section perpendicular to the flow direction and a length sufficient to provide a residence time long enough for (co)polymerizing the reactants to form the polymeric material with a desired polydispersity.

In a preferred embodiment, the flow-through polymerization reactor is a coil made from one or more tubes, e.g., steel tubes or metal tubes. A coil advantageously has a small compact size while providing a tunnel with a relatively long length in which a (co)polymerization can occur. By using steel or metal tube(s) to make a reactor in coil form, heat exchange may be more efficient. It is understood that tubes made of thermally conducting plastics can also be used in making a polymerization reactor in a coil form.

The diameter and length of a tube for making a flow-through reactor in a coil form can affect the residence time for the polymerization reactor. Any combination of diameter and length can be used so long that the residence time is sufficiently long to consume at least one type of reactants. Where the diameter is too small and/or the lengh is too long, there may have a large pressure built-up in the reactor. The diameter of each tube for making a flow-through reactor in a coil form is up to about 100 mm, preferably up to 20 mm, more preferably up to 5 mm and most preferably from about 0.5 mm to about 2.5 mm. The total length of one or more tubes for making a flow-through reactor in a coil form is preferably from about 5 m to about 100 m, more preferably from about 10 m to about 65 m.

Where a catalyst is needed to accelerate a (co)polymerization, the tunnel of a flow-through polymerization reactor in a coil form can be filled with catalysts in any known forms, or alternatively, the wall of the tunnel of a flow-through polymerization reactor in a coil form can be coated with a catalyst.

It is also understood that the tunnel of a flow-through polymerization reactor in a coil form can be filled with any of a variety of filling materials, including reagents. These filling materials, in certain embodiments, can be used to perform useful chemical and/or biological reactions. For example, beads with covalently bound carbodiimide can fill a flow-through polymerization reactor in which a (co)polymer can be formed by coupling carboxyls and amines of monomers, prepolymer, chain extenders, and/or macromers.

It is discovered that, although a flow-through reactor can prolong the residence time for step-reaction (co)polymerization of organic di- and/or polyamines (i.e., monomers and prepolymers having two or more amino groups) with di- and/or polyisocyanates and can produce polymeric materials, a small fraction of high-molecular-weight polymers, which are insoluble in the used solvent in the reacting solution (or fluid), can be formed in the polymerization reactor. It is believed that this high-molecular-weight fraction may be, inter alia, due to non-uniform local concentration profiles of reactants and formed intermediates, across a cross section substantially-perpendicular to the flow direction. It is well known that when a fluid flows through a tube or tunnel, there are differences in local flow rate of the fluid depending upon its distance from the tunnel or tube wall. At or near the wall, the flow rate is slowest (i.e., lamella flow or dead volume). The farther from the wall the fluid is, the faster the flow rate is. Because of this difference in local flow rate, reactants (monomers and reactive intermediate polymers) have a residence much longer in the thin layer in contact with the tube or tunnel wall than in the "bulk" fluid, since diffusion generally is a relatively slow process, especially for intermediate polymers formed and to be reacted further. The term "bulk" is used herein to describe a part of fluid or solution that is not immediately near the tube or tunnel wall. Such differentiation in residence time can lead to the formation of macromolecules having a very high degree of polymerization, which are known to form, in the case of free-radical polymerization or copolymerization, or step-wise polymerization or copolymerization. These high-molecular-weight fractions may not be desirable, decrease product quality, or at least lead to a considerable broadening of the molar mass distribution $$\left(\text{e.g., } \frac{M_w}{M_n} \geq 6\right).$$

This may also cause unwanted deposits to form in the reactor system and the deposit formation in the reactor system can lead to a blockage of the system and excludes long-term operation.

Applicants have solved this problem by immersing the polymerization reactor in an ultrasonic bath. By doing this, formation of unwanted high-molecular-weight fractions of a polymer can be minimized or eliminated substantially. As used herein, "unwanted high-molecular-weight fractions of a polymer" is intended to describe fractions of the polymer which have high-molecular-weight and/or are insoluble in the original solvent for the reacting (polymerization) solution. It is believed that ultrasonic wave can accelerate diffusion so that a substantially-uniform, cross-sectional concentration profiles of reactants (e.g., monomers, initiators, and/or reactive intermediate polymers) can be maintained within the polymerization reactor (or minimize lamella flow or dead volume). The term "cross-sectional concentration profile" refers to a concentration profile of reactants on a cross-section substantially perpendicular to flow direction. By minimizing or eliminating formation of unwanted high-molecular-weight fractions of polymers, product quality can be substantially enhanced, a narrow polydispersity $$\text{e.g., } \frac{M_w}{M_n}$$

being less than about 6.0, preferably less than about 5.0, more preferably less than about 4.0, even more preferably less than about 3.0) may be achieved, and the potential blockage of the reactor system due to deposits can be avoided.

Any known suitable ultrasonic baths can be used in the invention. It should be understood that if an ultrasonic bath has a temperature control capability, it can also be used to control the (co)polymerization temperature as well known to a person skilled in the art. By controlling the temperature of the reacting solution to be fed into the flow-through polymerization reactor and the (co)polymerization temperature within the flow-through polymerization reactor, one can control the rate of (co)polymerization within the flow-through polymerization reactor.

Where a (co)polymerization is too fast, there could be gelation in microreactor and the gelation can clog the whole system, especially the microeactor due to the characteristic small dimensions of its internal structures. Where a (co)polymerization is too slow, an extremely long residence may be needed to complete (co)polymerization. Combination of at least one microreactor and at least one flow-through polymerization reactor immersed in an ultrasonic bath can ensure the controllability and reproducibility of a (co)polymerization.

It is understood that other externally forced mass transport, such as, for example, stirring or shaking can be used to accelerate diffusion so that a substantially-uniform, cross-sectional concentration profiles of reactants (e.g., monomers, initiators, and/or reactive intermediate polymers) can be maintained within the polymerization reactor (i.e., maintaining substantially uniform distribution of residence time in microscopic level and/or minimize dead volume in the flow-through polymerization reactor).

For example, mixing chambers, e.g. like micromixers, can be built in the flow-through polymerization reactor. Each mixing chamber comprises magnetic beads. The mixing in each mixing chamber can be externally driven by stimulating bead motion.

Another example is use of an extruder or a device based on extruding technology. An extruder can be served as a flow-through polymerization reactor. Where an extruder is used, there is no need to immerse the flow-through polymerization reactor in an ultrasonic bath, since the extruder can stir the reacting solution and accelerate diffusion so that a substantially-uniform, cross-sectional concentration profiles of reactants (e.g., monomers, initiators, and/or reactive intermediate polymers) can be maintained within the polymerization reactor (i.e., maintaining substantially unform distribution of residence time in microscopic level and/or minimize dead volume in the flow-through polymerization reactor).

In a preferred embodiment, the process of the invention further comprises a step of reacting the (co)polymer collected from the polymerization reactor with one or more reactants each of which is selected from the group consisting of a monomer, an initiator, a coupling agent, a chain extender, a prepolymer, a macromer, and mixtures thereof. This step can be performed in a reactor or microreactor or a system including at least one microreactor and at least one flow-through polymerization reactor. With such additional reaction step, one can prepare block copolymers in a continuous process.

In another preferred embodiment, the process of the invention further comprises a step of reacting the (co)polymer collected from the polymerization reactor with one or more reactants to introduce ethylenically unsaturated groups into the resultant polymer. As an illustrative example, the resultant polymer collected from the flow-through polymerization reactor is a polyurethane, polyurea, polyamide, polyether, or polyester with terminal functional groups, such as, for example, isocyanate, hydroxyl, carboxy, epoxy, amino, or carbonyl halide, and the like. In this case, such polymeric material can react with a compound with at least one ethylenically unsaturated group and a functional group coreactive with the terminal functional groups of the polymeric material, as known to a person skilled in the art.

In alternative embodiments, the process of the invention can optionally comprise one or more of the following steps: exchanging a solvent used in the reacting solution with water or a water-soluble or miscible solvent; adjusting the pH of the reacting solution before or after (co)polymerization in the polymerization reactor; partially or completely removing an organic solvent used in the reacting solution after (co)polymerization in the polymerization reactor (e.g., by wiped-film distillation, or the like); filtering the resultant (co)polymer; separating the resultant (co)polymer from the reacting solution; purifying the resultant (co)polymer.

Figure 1:
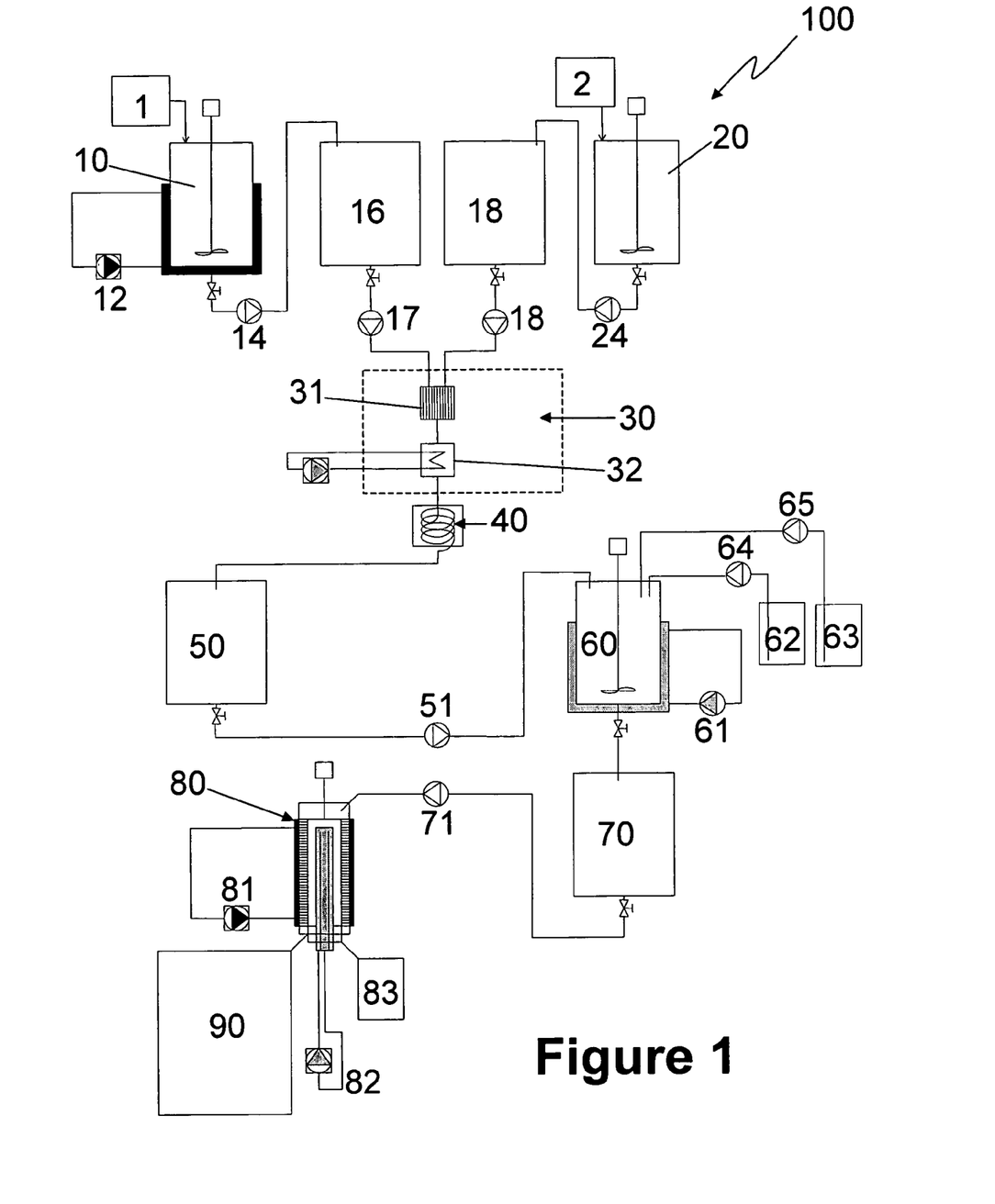
FIG. 1 shows a flow chart for a continuous-flow process for producing a prepolymer suitable for making hydrogel contact lens according to a preferred embodiment of the invention.

FIG. 1 schematically illustrates a continuous-flow process 100 for preparing an actinically-crosslinkable polyurea prepolymer 90.

A first solution is prepared by dissolving reagent 1 in a solvent (e.g., a water-THF mixture) in a mixing tank 10 in which the temperature is controlled and maintained at a desired temperature (e.g., 0 to 5° C.) with a heating/refrigeration circulator 12. Reagent 1 can comprises, for example, poly(oxyalkylene)diamine (e.g., Jeffamine® XTJ501 and Jeffamine® XTJ502) and a triamine (e.g., bis-hexamethylenetriamine).

A second solution is prepared by dissolving reagent 2 in a solvent (e.g., tetrahydrofuran (THF)) in a mixing tank 20. Reagent 2 can comprises, for example, diisocyanate (e.g., isophorone diisocyanate from Aldrich Chemicals) and triisocyanate (e.g., VESTANAT® T1890/100 from Degussa Chemicals).

Figure 2:
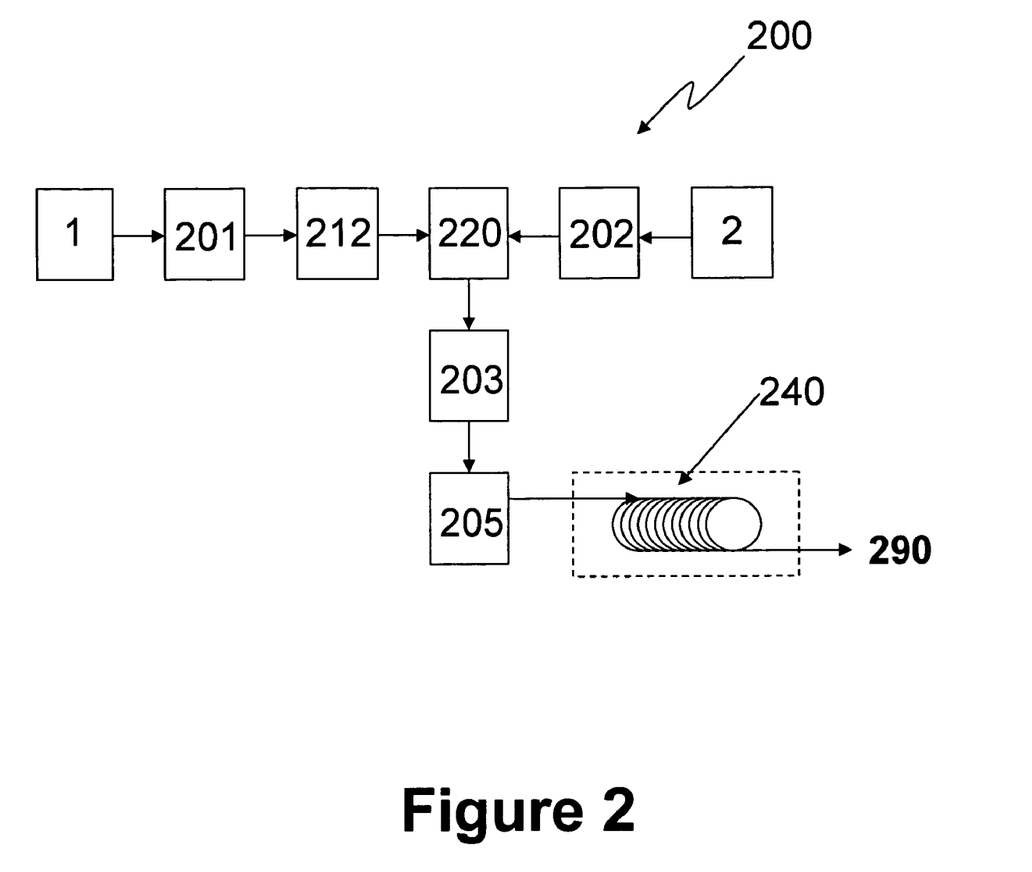
FIG. 2 shows a flow chart for a system for carrying out a (co)polymerization according to a preferred embodiment of the invention.

The first and second solutions are pumped separately into holding tanks 16 and 18 and then can be introduced by using metering pumps 17 and 18 (or equivalents) into a microreactor 30 which comprises a micromixing module 31 and heat exchanger module 32. An exemplary microreactor is shown in FIG. 2. Microreactor 30 mixes the first and second solutions to form a reacting solution which is fed into a flow-through polymerization reactor 40 (e.g., a coil made from a steel tube) immersed in an ultrasonic bath. Reagent 1 and reagent 2 are copolymerized to form an amino group-capped polyurea polymer collected in tank 50 which subsequently is fed into a batch reactor 60. An acryloyl chloride 62 is added by a metering pump 64 into batch reactor 60 in which it is mixed with the amino group-capped polyurea polymer to form a reaction mixture the pH of which is adjusted by adding a NaOH solution 63 with a metering pump 65. The temperature of batch reactor 60 is controlled with a refrigeration circulator 61. After reaction, an acrylated polyurea prepolymer is formed in the reaction mixture which is collected in tank 70 and then introduced by a metering pump 71 into a distilator 80 where organic solvent 83 (e.g., THF) is removed from product 90 (i.e., the acrylated polyurea prepolymer). The distilator 80 can be a wiped-film distillation equipped with a heating circulator 81 and a refrigeration circulator 82. A person skilled in the art will understand that the product 90 can be further purified, e.g., by ultrafiltration.

Figure 3:
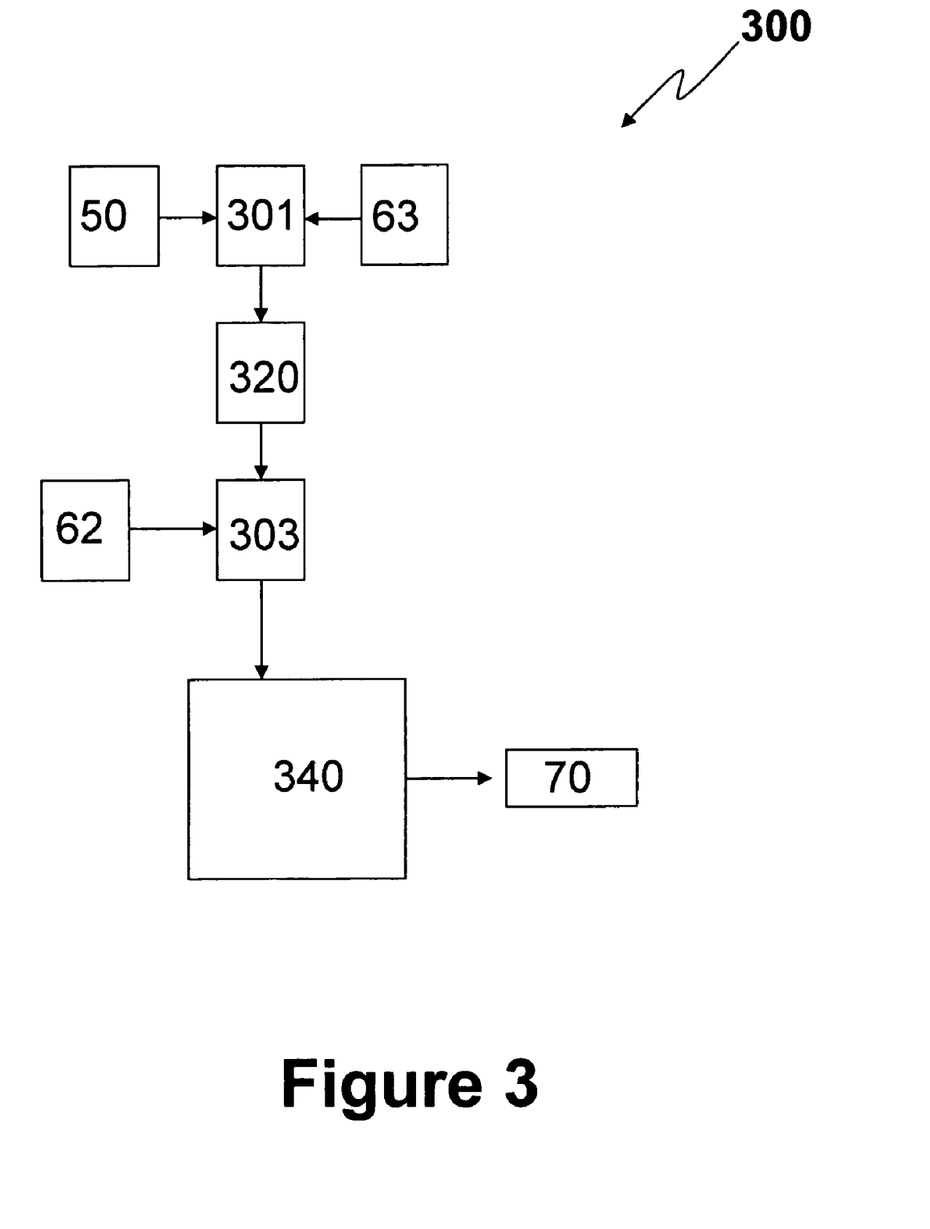
FIG. 3 shows a flow chart for a system for carrying out an acrylation reaction according to a preferred embodiment of the invention.

It is understood that the acrylation reaction performed in batch reactor 60 can be alternatively performed in a microreactor, one example of which is shown in FIG. 3. The reaction mixture containing the amino-capped polyurea polymer is fed from tank 50 into the microreactor 300 through an inlet of the microreactor 300. Before mixing with acryloyl chloride 62 in a mciromixer 303, the reaction mixture containing the amino-capped polyurea polymer is mixed with NaOH solution 63 in a micromixer 301 to adjust pH, then is heated or cooled with a heat exchanger 320. A microreacting module 340 is incorporated downstream of the micromixer 303 to provide enough residence time for acrylation reaction. After reaction, the reaction mixture is fed into tank 70.

In another aspect, the present invention provides a system for preparing a polymeric material in a continuous-flow manner, the system comprising: at least one microreactor into which at least two solutions, each comprising one or more reactants, can be introduced and mixed to form a reacting solution, wherein each reactant is selected from the group consisting of a monomer, an initiator, a coupling agent, a chain extender, a prepolymer, a macromer, and mixtures thereof; a flow-through polymerization reactor which is in a coil form and in flow communication with the microreactor so that the reacting solution can be fed continuously into the flow-through polymerization reactor, wherein the flow-through polymerization reactor is capable of providing a residence time for (co)polymerizing the reactants to form a polymer with a desired polydispersity, wherein the flow-through polymerization reactor is immersed in an ultrasonic bath to minimize or substantially eliminate formation of unwanted high-molecular-weight fractions of the polymer.

In alternative preferred embodiments, the system of the invention can further comprise one or more of an additional microreactor, solvent exchanger device, distillation device, filter, sensors, detectors, separation device, and the like.

In a preferred embodiment, the system of the invention further comprises an in-line quality control system.

FIG. 2 shows a system 200 of the invention according to a preferred embodiment. The system 200 comprises a microreactor and a flow-through polymerization reactor 240 (a coil made of a steel tube) immersed in an ultrasonic bath and in flow communication with the microreactor. The microreactor as shown in FIG. 2 comprises three heat exchanger modules (201, 202, and 203), a temperature sensor module 205, a pressure sensor module 212, and a micromixer module 220. Heat exchanger modules (201, 202) can be plate-type heat exchangers (e.g. from EHRFELD Mikrotechnik BTS GmbH). Heat exchanger module (203) can be coaxial heat exchanger (e.g. from EHRFELD Mikrotechnik BTS GmbH). Micromixer module 220 can be split plate mixer LH 25 from EHRFELD Mikrotechnik BTS GmbH. All modules are assembled as shown in FIG. 2. Solution 1 is introduced through an inlet of the microreactor and heated or cooled with heat exchanger module 201 before introducing into micromixer 220. Similarly, Solution 2 is introduced through an inlet of the microreactor and heated or cooled with heat exchanger module 202 before introducing into micromixer 220. Solutions 1 and 2 are mixed to form a reacting solution which is heated or cooled with heat exchanger module 203 before exiting the outlet of the microreactor. It is advantageously that a pressure sensor module 212 is included in the microreactor to help controlling the pressure in the system 200.

There are several advantages associated with the invention.

First, the reliability and reproducibility of a process of the invention is relatively high, since it is easy to control numerous reaction conditions (e.g., temperature, reactant concentrations, uniform local concentration profile of reactants, reaction time in a reactor, pressure, reaction medium, etc.). The use of combination of at least one microreactor and at least one flow-through polymerization reactor in a coil form allows very accurate control over flow rates. This fine control over flow rate together with precise control over residence time in the reactor provides a highly controllable reacting system. The fine fluidic control of the present method also has the advantage of enabling the matching of the input reagents to the correct stoichiometry of the reaction. This can result in a more efficient and cost-effective process which leaves little or no unreacted reagents which would otherwise reduce the yield of the main product. This also reduces, and may eliminate completely, the need for extensive purification procedures for the product.

The start up of reactions may be induced through the use of external influences such as heat, light or electrical activity, as is carried out in conventional chemical synthesis. Additional measures may be used to halt reactions through the use of an external influence or through the removal of an influence. As an example a heater may be used to initiate a reaction and a cooling element to halt the reaction.

The improved reaction control in the present method allows the production of reagents under highly defined conditions. This control will allow hazardous reagents to be produced and controlled such that they are maintained in a safe manner. The reduced amount of the reagents both within the lead-in flow paths or microchannels or the flow-through polymerization reactor and within the microreactor itself reduces potential risks associated with handling hazardous or explosive reagents.

Second, it is fast and reliable to screen for robustness of a polymer synthesis process.

Third and most importantly, with the invention one can increase throughput in production of a polymer material by a numbering-up approach, rather than by scaling-up. Just by multiply repeating the functional units of a reactor system of the invention, e.g., microreactor and polymerization reactor, one can increase the production throughput. Numbering-up can ensure that desired features of a basic unit are kept when increasing the total system size. This will provide to a manufacture a more flexible response to market demands.

A process and system of the invention can find particular use in preparing water-soluble, actinically-crosslinkable prepolymers which are suitable for making hydrogel contact lenses and macromers for making silicone-hydrogel contact lenses.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

EXAMPLE 1

Preparation of an amine solution (solution A). Solution A is prepared by dissolving Jeffamine® XTJ502 (Hunstman Chemicals) and bis-hexamethylenetriamine (Aldrich Chemicals) in tetrahydrofuran (THF)-water mixture (in a ratio of 400 grams of THF to 250 grams of water) in a jacketed 1 L reactor and cool to an internal temperature of 0 to 5° C. with agitation. The concentration of Jeffamine® XTJ501 is about 84 milli-equivalents (meq) based on amine group of Jeffamine® XTJ501 (Hunstman Chemicals), the concentration of Jeffamine® XTJ502 is 50 meq based on amine group, the concentration of bis-hexamethylenetriamine is 26.8 meq based on amine group.

Preparation of an isocyante solution (solution B). Solution B is prepared by dissolving isophorone diisocyanate (Aldrich Chemicals) and VESTANAT® 890/100 (Degussa Chemicals) in tetrahydrofuran (THF) to have 100 isocyante group meq of isophorone diisocyanate and 26.8 isocyante group meq of VESTANAT® T1890/100.

EXAMPLE 2

1. Copolymerization Without a Flow-Through Polymerization Reactor.

In a series of experiments, a reactor system as shown in FIG. 2 without the polymerization reactor 240 is used in preparing a polyurea polymer having terminal amine groups from solutions A and B. Plate-type of heat exchangers from EHRFELD Mikrotechnik BTS GmbH are used for the heat exchanger modules (201, 202). The heat exchanger module 203 is a coaxial heat exchanger from EHRFELD Mikrotechnik BTS GmbH. The micromixer module 220 is a slit plate mixer LH 25 from EHRFELD Mikrotechnik BTS GmbH. The temperature sensor module 205 and the pressure sensor module 212 are from EHRFELD Mikrotechnik BTS GmbH. The ratio of flow rate of solution A to solution B is maintained about 7:6. The total flow rate, which is the sum of the flow rates of solution A and solution B, varies from 2 ml/min to 15 ml/min. The temperatures of micro heat exchanger modules (201, 202) are almost identical and set at 15° C. or 20° C. The temperature measured in the micromixer 220 is varied from 7° C. to 39° C., depending upon the total flow rate. The higher the total flow rate is, the higher the temperature in the micromixer. The temperature of micro heat exchanger module 203 is set at −8, 0, 5, 25, 30, 35, 40, 50, or 60° C. It is observed that all solutions collected immediately after temperature sensor module 205 are/become cloudy/milky and/or gelation occurs in the collecting container. The gelation in the collecting container can be eliminated by stirring. Results of this series of experiments indicate that a microreactor alone is not suitable for preparing a polyurea polymer based on step-growth (or step-reaction) copolymerization between di- or polyamines and di- or polyisocyanates.

2. Copolymerization With a Flow-Through Polymerization Reactor Which is not Immersed in an Ultrasonic Bath.

In another experiment, a flow-through polymerization reactor in a coil form is connected to the temperature sensor module 205 of the above microreactor. The flow-through polymerization reactor is a Teflon tube (I.D.=4.35 mm and length=3.4 m) wrapping around a cylinder. This system is used to prepare a polyurea polymer having terminal amine groups from solutions A and B. The flow rate of solution A is about 8.8. ml/min and the flow rate of solution B is about 1.16 ml/min. The temperatures of micro heat exchangers modules (201, 202) are almost identical and set at 15° C. or 20° C. The temperature measured in the micromixer 220 is about 23° C. The temperature of micro heat exchanger module 203 is set at 35° C. The residence time in the coil can be calculated by the following equation $$\text{residence time} = \frac{\text{coil length} \times \pi \left(\frac{\text{coil's internal diameter}}{2}\right)^2}{\text{total flow rate}}.$$

A solution collected immediately after the flow-through polymerization reactor is clear but contains flakes.

3. Copolymerization With a Flow-Through Polymerization Reactor Which is Immersed in an Ultrasonic Bath.

A. A coil made from one or more steel tubes is used to replace the above Teflon tube in another series of experiments. The coil has an I.D. (inner diameter) of 2.1 mm and a length of 14.5 or 58 m. The flow rate of solution A is about 12.8, 13.26 or 51.28 ml/min while the flow rate of solution B is 1.74 or 2.18 or 8.74 ml/min. The temperatures of micro heat exchangers modules (201, 202) are almost identical and set at 20° C. The temperature measured in the micromixer 220 is about 23±1° C. The temperature of micro heat exchanger module 203 is set at about 30° C. A solution collected immediately after the flow-through polymerization reactor is clear and is used in preparing actinically-crosslinkable polyurea prepolymer by acrylation of the resultant polyurea polymer having terminal amine groups in Example 3.

B. A series of experiments are carried out to examine effects of the temperature and reactant concentrations (or stoichiometry of reactants) on step-growth copolymerization. Different temperatures of micro heat modules (201, 202, 205) are set to examine effects of the temperatures before and after mixing in micromixer on reproducibility of copolymerization. Isocyanate concentrations are varied as shown in Table 1 while keeping stoichiometry substantially constant.

TABLE 1

| test | Flow rate [ml/min] Sol. A | Flow rate [ml/min] Sol. B* | Total Flow [ml/min] | $T_1$ & $T_2$ settings [° C.] | $T_1$ [° C.] | $T_2$ [° C.] | $T_m$ [° C.] | $T_3$ setting [° C.] | $T_5$ [° C.] | $T_{bath}$ [° C.] | Coil I.D. mm | Coil Length m | Note |
|---|---|---|---|---|---|---|---|---|---|---|---|---|---|
| 1 | 12.8 | 2.2 | 15.0 | 10.0 | 12.9 | 14.0 | 12.7 | 5.0 | 10.5 | 31.7 | 2.1 | 58 | Clear with some gelation inside the coil |
| 2 | 12.80 | 2.18 | 15.0 | 20.0 | 22.0 | 22.1 | 25.0 | 30.0 | 29.9 | 31.7 | 2.1 | 58 | Clear with strong gelation inside the modules |
| 3 | 49 | 11 (75%) | 60 | 20 | no data | no data | no data | 30 | no data | 30.5 | 2.1 | 58 | Gelation. |
| 4 | 44.2 | 15.8 (50%) | 60 | 20 | no data | no data | no data | 30 | no data | 30.5 | 2.1 | 58 | Gelation. |
| 5 | 36.3 | 23.7 (25%) | 60 | 20 | 21.6 | 21.6 | 21 | 30 | 27.3 | 31.5 | 2.1 | 58 | Clear |
| 6 | 36.3 | 23.7 (25%) | 60 | 20 | 21.6 | 21.6 | 21 | 30 | 26.5 | 31.9 | 2.1 | 58 | Clear |
| 7 | 54.5 | 35.5 (25%) | 90 | 20 | 21.6 | 21.6 | 21 | 30 | 25.5 | 32 | 2.1 | 58 | Clear |
| 8 | 45.1 | 15.0 (50%) | 60 | 10 | 12.1 | 12.3 | 12.6 | 10 | 13.6 | 19.2 | 2.1 | 58 | Clear |
| 9 | 45.1 | 15.0 (50%) | 60 | 10 | 12.2 | 12.4 | 12.5 | 10 | 13.8 | 31.3 | 2.1 | 29 | Clear |
| 10 | 51.5 | 8.5 (100%) | 60 | 5 | 7.4 | 7.5 | 8.7 | 5 | 9.8 | 14.7 | 2.1 | 29 | Clear |

"$T_1$ setting" refers to the temperature setting for the heat exchange module 201 in FIG. 2.
"$T_2$ setting" refers to the temperature setting for the heat exchange module 202 in FIG. 2.
"$T_3$ setting" refers to the temperature setting for the heat exchange module 203 in FIG. 2.
$T_1$ refers to the temperature at the outlet of the heat exchange module 201.
$T_2$ refers to the temperature at the outlet of the heat exchange module 202.
$T_m$ refers to the temperature in the micromixere module 220.
$T_5$ refers to the temperature determined by the temperature sensore module 205.
*Percentage number in the parenthesis represent that the used solution is the percentage dilution of Solution B prepared according to procedure described in Example 1.

Results shown in Table 1 indicate that for copolymerization based on reactions between isocyanate and amino groups, the temperatures of micro heat modules (201, 202, 205) would be advantageously set at relatively low temperatures to substantially reduce copolymerization rate so that gelation in the microreactor and in the flow-through polymerization reactor can be eliminated under ultrasonication. Similarly, by diluting the concentrations of isocyanates while maintaining substantially the stoichiometry, even at relatively high temperature gelation can be minimized or eliminated. Therefore, it is preferably that the temperatures of micro heat modules (201, 202, 205) and/or combination of stoichiometry of amines and isocyanates can be adjusted to ensure that no substantial copolymerization occur in the microreactor and that most copolymerization occurs in the flow-through polymerization reactor in a coil form.

EXAMPLE 3

Preparation of actinically-crosslinkable prepolymers. Several resultant reaction mixtures containing amino group-capped polyurea polymer from Example 2 (three solutions from 3A and 6 solutions (tests 5-10) from 3B) are used to prepare actinically-crosslinkable polyurea prepolymer as follows. A reaction mixture is stirred for 30 minutes whilst maintaining an internal temperature of 0 to 5° C. Three additions of 22 grams of sodium carbonate (20% aqueous), followed by 3 grams of acryloyl chloride (Aldrich Chemicals) are made with approximately 30 minutes between each addition, whilst maintaining an internal temperature below 10° C. After the $3^{rd}$ addition, the reaction mixture is stirred for a further 30 minutes whilst allowing the internal temperature to reach ambient. The reaction mixture is filtered over 17 µm sintered glass filter. The product is then concentrated on a rotary evaporator to afford a solution essentially free of THF. The solution is ultrafiltered over a 1-kiloDalton membrane until the conductivity of the permeate measures below 30 µS/cm. The solution is further purified by passing the solution through a 0.45 µm Teflon membrane under pressure. The solution is stabilized with 20-200 ppm of hydroxyl-TEMPO.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A continuous-flow process for producing a polymeric material, comprising the steps of:
   a) introducing at least two solutions, each comprising one or more reactants, into a microreactor including a micromixer to mix the two solutions to form a reacting solution, wherein each reactant is selected from the group consisting of a monomer, an initiator, a coupling agent, a chain extender, a prepolymer, a macromer, and mixtures thereof, wherein the temperature of at least one solution to be fed into the micromixer relatively low and/or the concentration of at least one reactant is diluted sufficiently while maintaining a desirable total stoichiometry of the reactants constant so as to ensure no substantial (co)polymerization occurring in the microreactor; and
   b) feeding continuously the reacting solution into a flow-through polymerization reactor in a coil form, wherein the flow-through polymerization reactor is capable of providing a residence time sufficient for (co)polymerizing the reactants to form a (co)polymer with a desired polydispersity, wherein the flow-through polymerization reactor is immersed in an ultrasonic bath to minimize or substantially eliminate unwanted high-molecular-weight fractions of the (co)polymer.

2. The process of claim 1, wherein the (co)polymer comprises polymer-building units each of which is covalently linked to another unit by a covalent bond or linkage formed under known reaction conditions, such as, oxidation-reduction conditions, condensation conditions, addition conditions, substitution (or displacement) conditions, free radical polymerization conditions, 2+2 cyclo-addition conditions, Diels-Alder reaction conditions, ROMP (Ring Opening Metathesis Polymerization) conditions, vulcanization conditions, cationic crosslinking conditions, and epoxy hardening conditions.

3. The process of claim 2, wherein the covalent bond or linkage is a carbon-carbon single bond, a carbon-carbon double bond, ester linkage, ether linkage, acetal linkage, ketal linkage, vinyl ether linkage, carbamate linkage, urea linkage, urethane linkage, amine linkage, amide linkage, enamine linkage, imine linkage, imide linkage, oxime linkage, amidine linkage, iminoester linkage, carbonate linkage, orthoester linkage, phosphonate linkage, phosphinate linkage, sulfonate linkage, sulfinate linkage, sulfide linkage, sulfate linkage, disulfide, sulfonamide linkage, sulfonamide linkage, thioester linkage, aryl linkage, silane linkage, siloxane linkage, heterocycle linkage, thiocarbonate linkage, thiocarbamate linkage, or phosphonamide linkage.

4. The process of claim 1, wherein the a polymeric material is a prepolymer or a macromer suitable for making hydrogel contact lenses or silicone-hydrogel contact lenses.

5. The process of claim 1, wherein (co)polymerization of the reactants occurred in the flow-through polymerization reactor is a step-reaction (co)polymerization, step-reaction polycondensation reaction, ionic chain-reaction (co)polymerization, complex coordinative (co)polymerization, or free-radical chain (co)polymerizations.

6. The process of claim 5, wherein (co)polymerization of the reactants occurred in the flow-through polymerization reactor is a step-reaction (co)polymerization, wherein one of the two solutions comprises a first class of one or more reactants whereas the other of the two solutions comprises a second class of one or more reactants, wherein each of the first class of the reactants comprises two or more first crosslinkable groups and each of the second class of the reactants comprises two or more second crosslinkable groups coreactive with the first crosslinkable groups to form covalent bonds or linkages.

7. The process of claim 1, wherein the flow-through polymerization reactor is a compact device having a tunnel with a length of from about 2 m to about 100 m and being built in the device to let a liquid flow-through.

8. The process of claim 7, wherein the tunnel has a substantially circular cross-section perpendicular to the flow direction.

9. The process of claim 1, wherein the flow-through polymerization reactor is a coil made from one or more tubes.

10. The process of claim 9, wherein each tube has a diameter of up to about 20 mm.

11. The process of claim 9, wherein each tube has a diameter of from about 0.5 mm to about 5 mm.

12. The process of claim 9, wherein the total length of the one or more tubes for making the flow-through reactor in a coil form is from about 2 m to about 100 m.

13. The process of claim 12, wherein the total length of the one or more tubes for making the flow-through reactor in a coil form is from about 10 m to about 65 m.

14. The process of claim 7, wherein the tunnel is filled with one or more catalysts, or wherein the wall of the tunnel is coated with one or more catalysts.

15. The process of claim 1, wherein the polymer has a polydispersity, $$\frac{M_w}{M_n},$$

of about 5.0 or less.

16. The process of claim 1, wherein the ultrasonic bath is capable of controlling the (co)polymerization temperature in the flow-through polymerization reactor.

17. The process of claim 1, further comprising after the step (b) a step of reacting the (co)polymer collected from the polymerization reactor with one or more additional reactants each of which is selected from the group consisting of a monomer, an initiator, a coupling agent, a chain extender, a prepolymer, a macromer, and mixtures thereof.

18. The process of claim 1, further comprising: after the step (b),
   c) a step of reacting the (co)polymer collected from the polymerization reactor with one or more additional reactants to introduce ethylenically unsaturated groups into the (co)polymer obtained in step (b), wherein the (co)polymer obtained in step (b) comprises terminal functional groups, wherein each of the one or more additional reactants comprises at least one ethylenically unsaturated group and a functional group coreactive with the terminal functional groups of the (co)polymer.

19. The process of claim 18, wherein the step (c) is performed in a reactor or a microreactor or a system including at least one microreactor and at least one flow-through polymerization reactor.

20. A continuous-flow process for producing a polymeric material, comprising the steps of:
   a) introducing at least two solutions, each comprising one or more reactants, into a microreactor to mix the two solutions to form a reacting solution, wherein each reactant is selected from the group consisting of a monomer, an initiator, a coupling agent, a chain extender, a prepolymer, a macromer, and mixtures thereof, wherein the temperature of at least one solution to be fed into the micromixer relatively low and/or the concentration of at least one reactant is diluted sufficiently while maintaining a desirable total stoichiometry of the reactants constant so as to ensure no substantial (co)polymerization occurring in the microreactor; and
   b) feeding continuously the reacting solution into at least one extruder or device based on extruding technology, wherein the extruder or device is capable of providing a residence time sufficient for (co)polymerizing the reactants to form a polymer with a desired polydispersity and capable of disturbing lamella flow of the reacting solution so as to minimize or substantially eliminate unwanted high-molecular-weight fractions of the polymer.

* * * * *